US007157864B2

(12) United States Patent
Ito et al.

(10) Patent No.: US 7,157,864 B2
(45) Date of Patent: Jan. 2, 2007

(54) VEHICULAR LAMP, COLD CATHODE FLUORESCENT LAMP LIGHTING APPARATUS, AND COLD CATHODE FLUORESCENT LAMP LIGHTING METHOD

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 77 days.

(21) Appl. No.: 11/124,023

(22) Filed: May 6, 2005

(65) Prior Publication Data

US 2005/0248282 A1 Nov. 10, 2005

(30) Foreign Application Priority Data

May 10, 2004 (JP) ............................. 2004-140348

(51) Int. Cl.
*B60Q 1/00* (2006.01)

(52) U.S. Cl. ........................................ 315/291; 315/82

(58) Field of Classification Search ................ 315/291, 315/76, 77, 82

See application file for complete search history.

(56) References Cited

U.S. PATENT DOCUMENTS 5,658,180 A * 8/1997 Takagi ........................... 445/6
6,853,153 B1 * 2/2005 Gray .......................... 315/291
6,900,600 B1 * 5/2005 Rust et al. .................. 315/291

FOREIGN PATENT DOCUMENTS

JP 2000-173445 6/2000

OTHER PUBLICATIONS

Patent Abstracts of Japan, Publication No. 2000-173445 dated Jun. 23, 2000, 1 page.

* cited by examiner

*Primary Examiner*—David Vu
(74) *Attorney, Agent, or Firm*—Osha-Liang LLP

(57) ABSTRACT

There is provided a vehicular lamp that can prevent excess current from flowing between an anode and a cathode at the lighting-up start to prevent a damage and life shortening of a cold cathode fluorescent lamp at low cost. The vehicular lamp includes: a cold cathode fluorescent lamp having a cathode, a gate, and an anode; and a lighting controlling unit operable to pre-discharge electricity from the cathode to the gate prior to lighting of the cold cathode fluorescent lamp, in which the lighting controlling unit applies a voltage between the cathode and the anode after once lowering a voltage between the cathode and the gate and then again applies an extraction voltage between the cathode and the gate in order to begin to discharge electricity from the cathode to the anode. The lighting controlling unit may pre-discharge electricity from the cathode to the gate until the temperature of the cathode is substantially equal to that of lighting-up time.

4 Claims, 8 Drawing Sheets

VEHICULAR LAMP, COLD CATHODE FLUORESCENT LAMP LIGHTING APPARATUS, AND COLD CATHODE FLUORESCENT LAMP LIGHTING METHOD

This patent application claims priority from a Japanese Patent Application No. 2004-140348 filed on May 10, 2004, the contents of which are incorporated herein by reference.

BACKGROUND OF THE INVENTION

1. Field of the Invention

The present invention relates to a vehicular lamp, a cold cathode fluorescent lamp lighting apparatus, and a cold cathode fluorescent lamp lighting method.

2. Description of Related Art

Conventionally, a cold cathode fluorescent lamp having a cathode, a gate, and an anode previously applies an acceleration voltage between the anode and the cathode and applies an extraction voltage between the gate and the cathode to discharge electrons from the cathode toward the anode, and then collides the discharged electrons against a phosphor on the anode to cause the phosphor to emit light is known as disclosed, for example, in Japanese Patent Laid-Open No. 2000-173445. In the cold cathode fluorescent lamp, it is required that the extraction voltage when the electrons begin to be initially discharged be applied between the gate and the cathode more highly than that when the electrons are discharged stably.

However, if drop in the voltage is not performed till the extraction voltage to be applied during discharging the electrons stably after the discharge of the electrons starts, superfluous electrons are discharged from the cathode to the anode. Therefore, the anode is overheated, and thus the anode, the phosphor, a glass substrate on which the anode is formed, and so on have been damaged by heat in some cases. To solve this problem, after the discharge of the electrons starts from the cathode by applying the high extraction voltage between the gate and the cathode, it is required that the extraction voltage be rapidly dropt. Thereby, an apparatus for adequately illuminating the cold cathode fluorescent lamp became complicated in some cases. Therefore, there has been a problem that adequate lighting of the cold cathode fluorescent lamp needs high cost.

SUMMARY OF THE INVENTION

Therefore, it is an object of the present invention to provide a vehicular lamp, a cold cathode fluorescent lamp lighting apparatus, and a cold cathode fluorescent lamp lighting method that can solve the foregoing problems. The above and other objects can be achieved by combinations described in the independent claims. The dependent claims define further advantageous and exemplary combinations of the present invention.

According to the first aspect of the present invention, there is provided a vehicular lamp including: a cold cathode fluorescent lamp having a cathode, a gate, and an anode; and a lighting controlling unit operable to pre-discharge electricity from the cathode to the gate prior to lighting of the cold cathode fluorescent lamp, in which the lighting controlling unit applies a voltage between the cathode and the anode after once lowering a voltage between the cathode and the gate and then again applies an extraction voltage between the cathode and the gate in order to begin to discharge electricity from the cathode to the anode.

Since the lighting controlling unit pre-discharges electricity from the cathode to the gate prior to lighting of the cold cathode fluorescent lamp, it is easy to illuminate the cold cathode fluorescent lamp. Moreover, since the lighting controlling unit applies a voltage between the cathode and the anode after once lowering a voltage between the cathode and the gate and then again applies an extraction voltage between the cathode and the gate in order to begin to discharge electricity from the cathode to the anode, the lighting controlling unit can prevent excess current from flowing between the anode and the cathode at the lighting-up start. Therefore, it is possible to prevent a damage and life shortening of the cold cathode fluorescent lamp.

The lighting controlling unit may pre-discharge electricity from the cathode to the gate until the temperature of the cathode is substantially equal to that of lighting-up time. Thereby, if the lighting controlling unit only applies the same voltage as that of lighting-up time between the gate and the cathode and between the anode and the cathode, the lighting of the cold cathode fluorescent lamp can start.

According to the second aspect of the present invention, there is provided a lighting apparatus of a cold cathode fluorescent lamp having a cathode, a gate, and an anode operable to pre-discharge electricity from the cathode to the gate prior to lighting of the cold cathode fluorescent lamp, applies a voltage between the cathode and the anode after once lowering a voltage between the cathode and the gate, and then again applies an extraction voltage between the cathode and the gate in order to begin to discharge electricity from the cathode to the anode.

According to the third aspect of the present invention, there is provided a lighting method of a cold cathode fluorescent lamp having a cathode, agate, and an anode, including: a pre-discharge step of pre-discharging electricity from the cathode to the gate prior to lighting of the cold cathode fluorescent lamp; a pre-discharge canceling step of once lowering a voltage between the cathode and the gate after the pre-discharge step; an acceleration voltage applying step of applying an acceleration voltage between the cathode and the anode after the pre-discharge canceling step; and an extraction voltage applying step of applying an extraction voltage between the cathode and the gate after the acceleration voltage applying step.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
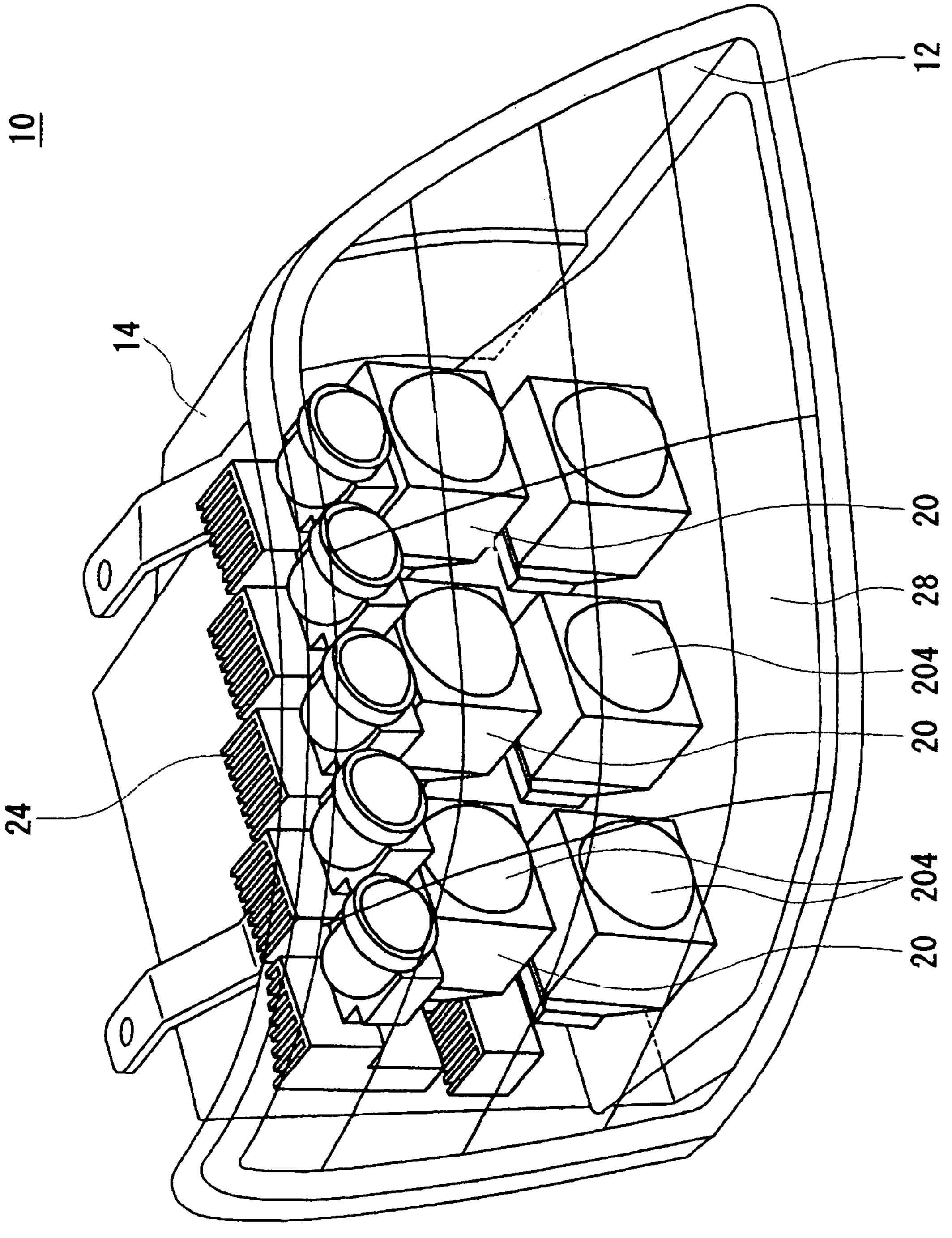
FIG. 1 is a perspective view showing a configuration of a vehicular lamp according to an embodiment of the present invention.
Figure 2:
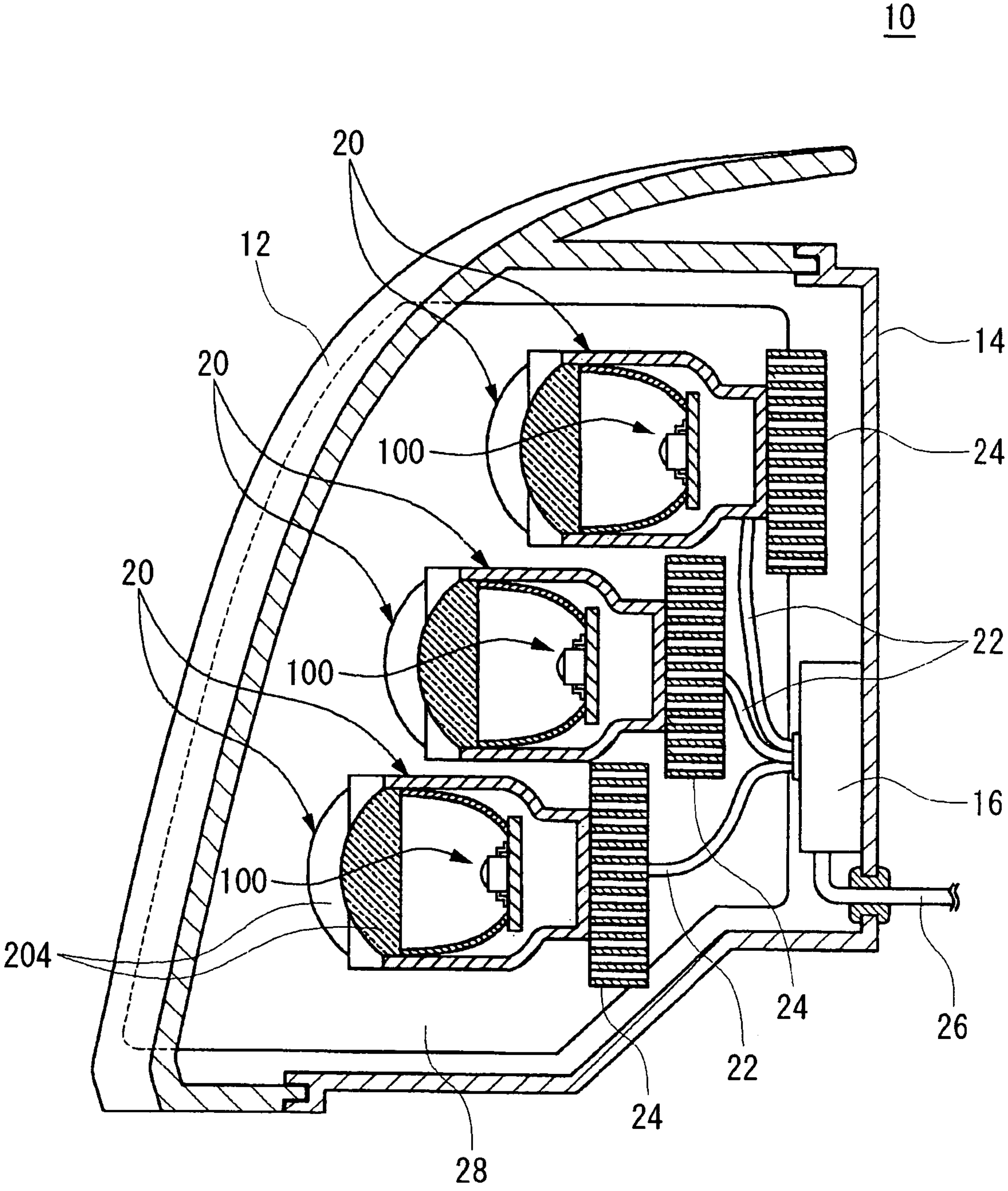
FIG. 2 is a horizontal sectional view of the vehicular lamp by a horizontal plane crossing a light source unit in the middle stage.

FIGS. 1 and 2 show configurations of a vehicular lamp 10 according to an embodiment of the present invention. FIG. 1 is a perspective view of the vehicular lamp 10. FIG. 2 is a horizontal sectional view of the vehicular lamp 10 by a horizontal plane crossing a light source unit 20 in the middle stage. The object of the present embodiment is to provide the vehicular lamp 10, which can prevent excess current from flowing between an anode and a cathode at the lighting-up start to prevent a damage and life shortening of a cold cathode fluorescent lamp, at low cost.

The vehicular lamp 10 is a headlight for a vehicle such as an automobile, and irradiates light ahead of the vehicle. The vehicular lamp 10 includes a plurality of light source units 20, a cover 12, a lamp body 14, a circuit unit 16, a plurality of heat dissipation members 24, an extension reflector 28, and cables 22 and 26. Each of the plurality of light source units 20 has a cold cathode fluorescent lamp 100 and lenses 204. The cold cathode fluorescent lamp 100 emits white light according to electric power received from the circuit unit 16 via the cable 22. The lenses 204 irradiate the light emitted from the cold cathode fluorescent lamp 100 outside the vehicular lamp 10. In this way, the light source unit 20 irradiates light forming a light distribution pattern of a vehicle ahead of the vehicle.

The light source unit 20 is supported on the lamp body 14 so that it can obliquely move by means of an aiming mechanism to adjust the direction of optical axis of the light source unit 20. The light source unit 20 may be supported on the lamp body 14 so that the direction of optical axis when a vehicle body is fitted with the vehicular lamp 10 heads downward, e.g., by about 0.3 to 0.6 degrees. In addition, the plurality of light source units 20 may have the same or similar light distribution characteristic as/to one another, or may have the light distribution characteristic different from one another. Moreover, in another example, one light source unit 20 may have the plurality of cold cathode fluorescent lamps 100.

The cover 12 and the lamp body 14 form a light room of the vehicular lamp 10, and the plurality of light source units 20 is accommodated within this light room. It is preferable that the cover 12 and the lamp body 14 seal and protect the light source unit 20 from water. The cover 12 is formed of materials transmitting light emitted from the cold cathode fluorescent lamp 100, e.g., in the transparent shape, and is provided in the front face of the vehicle so as to cover the front of the plurality of light source units 20. The lamp body 14 is provided to face the cover 12 holding the plurality of light source units 20 therebetween so as to cover the rear of the plurality of light source units 20. The lamp body 14 may integrally be formed with the body of the vehicle. The circuit unit 16 is a module on which a lighting circuit for illuminating the cold cathode fluorescent lamp 100 is formed. The circuit unit 16 is electrically connected to the light source units 20 via the cables 22. Moreover, the circuit unit 16 is electrically connected to the vehicle main body via the cable 26.

The plurality of heat dissipation members 24 is a heat sink that is provided to be in contact with at least a part of the light source units 20. The heat dissipation members 24 are formed of a material such as metal having thermal conductivity higher than that of air. The heat dissipation members 24 are movable with the light source units 20 within a scope that moves the light source units 20, e.g., as against a supporting point of an aiming mechanism, and are provided at intervals enough to adjust an optical axis of the light source units 20 as against the lamp body 14. The plurality of heat dissipation members 24 may integrally be formed of one metallic component. In this case, it is possible to efficiently radiate heat from the whole of the plurality of heat dissipation members 24. The extension reflector 28 is a reflecting mirror that is formed of, e.g., a thin metal plate from the bottom of the plurality of light source units 20 to the cover 12. Since the extension reflector 28 is formed to cover at least a part of the inside of the lamp body 14, the extension reflector 28 hides a shape of the inside of the lamp body 14 and thus improves an appearance of the vehicular lamp 10.

In addition, at least a part of the extension reflector 28 contacts with the light source unit 20 and/or the heat dissipation member 24. In this case, the extension reflector 28 has a function of a thermal conduction member that conducts heat generated from the cold cathode fluorescent lamp 100 to the cover 12. In this way, the extension reflector 28 radiates heat from the cold cathode fluorescent lamp 100. Moreover, a part of the extension reflector 28 is fixed to the cover 12 or the lamp body 14. The extension reflector 28 may be formed in the shape of the frame covering the upper side, the lower side, and the lateral side of the plurality of light source units 20. According to this example, it is possible to miniaturize the light source unit 20 by using the cold cathode fluorescent lamp 100 as a light source. In this way, for example, since a degree of freedom is also improved in relation to arrangement of the light source units 20, it is possible to provide the vehicular lamp 10 having a good design. In addition, in the present embodiment, although an example of the vehicular lamp of the present invention is explained by means of a headlight for vehicle, the vehicular lamp of the present invention is not limited to this headlight and may be a marker lamp of a road and a room light of the vehicle.

Figure 3:
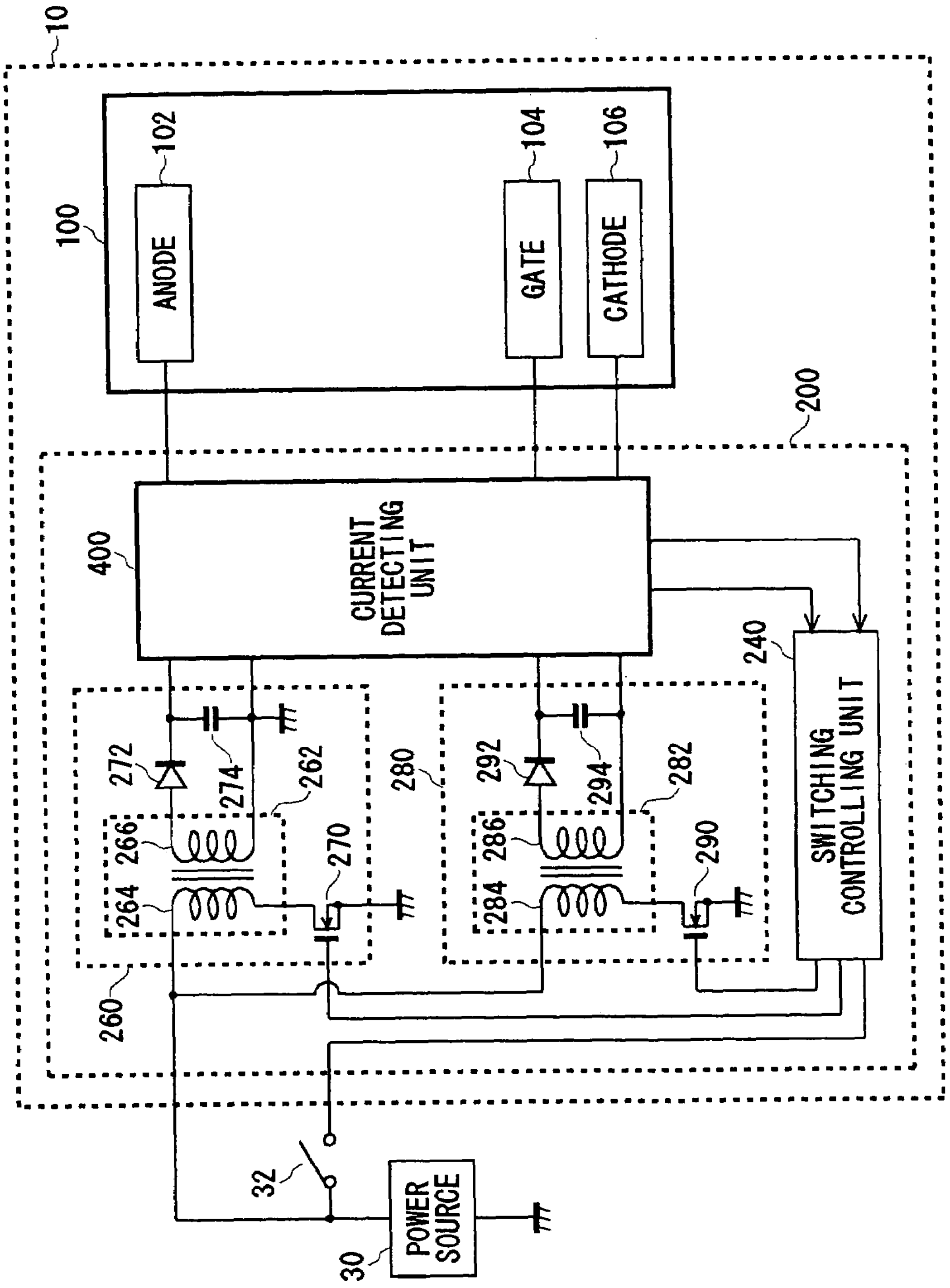
FIG. 3 is a block diagram exemplary showing a detailed configuration of the vehicular lamp.

FIG. 3 is a block diagram exemplary showing a detailed configuration of the vehicular lamp 10 along with the power source 30 and the switch 32. The power source 30 is provided in the vehicle main body, e.g., as a battery in-vehicle, and supplies electric power to the switch 32 and the vehicular lamp 10. The switch 32 is provided in the vehicle main body, and applies a voltage indicating High or Low to the vehicular lamp 10 according to a control signal of the vehicle in order to turn on or off the vehicular lamp 10. The vehicular lamp 10 includes the cold cathode fluorescent lamp 100 and a lighting controlling unit 200. In this example, in order to simplify description, the vehicular lamp 10 also includes one cold cathode fluorescent lamp 100.

The cold cathode fluorescent lamp 100 has an anode 102, a gate 104, and a cathode 106. A voltage by which high potential is given to the anode 102 is applied between the anode 102 and the cathode 106 by the lighting controlling unit 200. Moreover, a voltage by which high potential is given to the gate 104 is applied between the gate 104 and the cathode 106 by the lighting controlling unit 200. Thereby, electrons discharge from the cathode 106 and collide against the anode 102. A face on the anode 102 positioned to face the cathode 106 is applied with phosphors that emit, e.g., white light by a collision of the electron. For that purpose, the electrons discharged from the cathode 106 collide against the anode 102 and thus the cold cathode fluorescent lamp 100 emits light.

The lighting controlling unit 200 includes a switching control unit 240, a plurality of voltage applying unit 260 and 280, and a current detecting unit 400. The voltage applying unit has a transformer 262, a switching element 270, a diode 272, and a capacitor 274, and applies an acceleration voltage between the cathode 106 and the anode 102 of the cold cathode fluorescent lamp 100. The transformer 262 has a primary coil 264 and a secondary coil 266. One end of the primary coil 264 is connected to the power source 30, and another end is connected to a reference potential via the switching element 270. One end of the secondary coil 266 is connected to an anode of the diode 272, and another end is connected to a reference potential of the primary coil 264. The switching element 270 is serially connected to the primary coil 264, and is turned on or off according to a control signal from the switching control unit 240 to intermittently change the current flowing into the primary coil 264. The diode 272 is connected between the secondary coil 266 and the current detecting unit 400 in the forward direction. One end of the capacitor 274 is connected to a cathode of the diode 272, and another end is connected to a low potential side of the secondary coil 266. The transformer 262 outputs the electric power, which is accumulated while the switching element 270 is turned on, via the capacitor 274 while the switching element 270 is turned off.

The voltage applying unit 280 has a transformer 282, a switching element 290, a diode 292, and a capacitor 294, and applies a gate voltage between the cathode 106 and the gate 104. The transformer 282 has a primary coil 284 and a secondary coil 286. One end of the primary coil 284 is connected to the power source 30, and another end is connected to a reference potential via the switching element 290. One end of the secondary coil 286 is connected to an anode of the diode 292, and another end is connected to the capacitor 294. The switching element 290 is serially connected to the primary coil 284, and is turned on or off according to a control signal from the switching control unit 240 to intermittently change the current flowing into the primary coil 284. The diode 292 is connected between the secondary coil 286 and the current detecting unit 400 in the forward direction. One end of the capacitor 294 is connected to a cathode of the diode 292, and another end is connected to a low potential side of the secondary coil 286. The transformer 262 outputs the electric power, which is accumulated while the switching element 290 is turned on, via the capacitor 294 while the switching element 290 is turned off. In addition, in this example, although the voltage applying unit 260 and the voltage applying unit 280 constitutes a flyback switching regulator, in another example, the voltage applying unit 260 and the voltage applying unit 280 may be a forward switching regulator.

The current detecting unit 400 detects the current supplied from each of the voltage applying unit 260 and the voltage applying unit 280 to the cold cathode fluorescent lamp 100. The switching control unit 240 compares the current value detected by the current detecting unit 400 with a predetermined value, and generates, e.g., a known PWM or PFM signal based on the resultant error to control the time when each of the switching element 270 and the switching element 290 is turned on or off. In this way, the switching control unit 240 controls the voltage applying unit 260 and the voltage applying unit 280 so that the current flowing into the cold cathode fluorescent lamp 100 is equal to the predetermined value. Moreover, when the cold cathode fluorescent lamp 100 is turned on, i.e., when a voltage indicating High is received from the switch 32, the switching control unit 240 supplies the voltage to the cold cathode fluorescent lamp 100 in a predetermined routine according to after-mentioned lighting control to illuminate the cold cathode fluorescent lamp 100. In addition, the lighting controlling unit 200 is an example of a cold cathode fluorescent lamp lighting apparatus.

Figure 4:
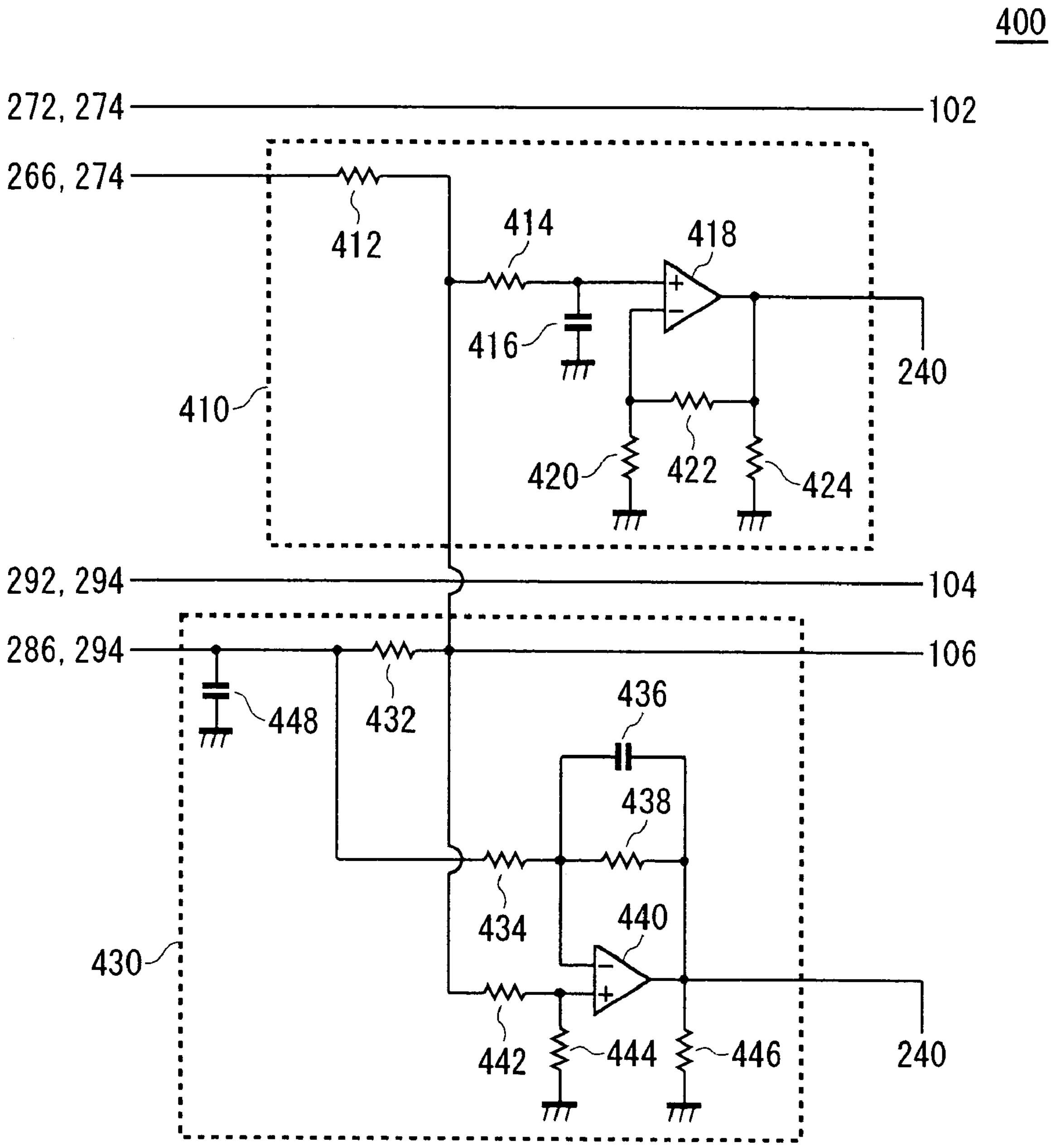
FIG. 4 is a circuit diagram exemplary showing a detailed configuration of a current detecting unit.

FIG. 4 is a circuit diagram exemplary showing a detailed configuration of the current detecting unit 400. The current detecting unit 400 includes an anode current detecting unit 410 and a gate current detecting unit 430. The anode current detecting unit 410 has a plurality of resistors 412, 414, 420, 422, and 424, a capacitor 416, and an operational amplifier 418. One end of the resistor 412 is connected to the secondary coil 266 and the low potential side of the capacitor 274, and another end is connected to a positive input terminal of the operational amplifier 418 via the resistor 414. A node between the resistor 412 and the resistor 414 is connected to the cathode 106. One end of the capacitor 416 is connected to the positive input terminal of the operational amplifier 418, and another end is connected to a reference potential. The resistor 414 and the capacitor 416 removes high-frequency component of the voltage, which is generated by the current flowing from the cathode 106 to the reference potential via the resistor 412, on the resistor 412 to apply the removed result to the positive input terminal of the operational amplifier 418.

One end of the resistor 420 is connected to a negative input terminal of the operational amplifier 418, and another end is connected to the reference potential. The resistor 422 is provided between an output terminal and the negative input terminal of the operational amplifier 418. The operational amplifier 418 amplifies the voltage received through the positive input terminal at an amplification factor determined by a resistance value of the resistor 420 and a resistance value of the resistor 422 to output the result to the output terminal. The resistor 424 is provided between the output terminal of the operational amplifier 418 and the reference potential. By such a configuration, the anode current detecting unit 410 detects the current flowing between a connecting point to the reference potential of the secondary coil 266 and the cold cathode fluorescent lamp 100 to detect an anode current flowing between the anode 102 and the cathode 106.

Here, in the transformer 262 of the voltage applying unit 260, the primary coil 264 and the secondary coil 266 are wound up close to each other in order to raise power conversion efficiency. Therefore, the transformer 262 has large parasitic capacitance between the primary coil 264 and the secondary coil 266. Thus, as the current in the primary coil 264 flows or does not flow, the high-frequency current based on the parasitic capacitance and a change of current of the primary coil 264 flows into the secondary coil 266. Moreover, when the cold cathode fluorescent lamp 100 is turned on, e.g., the voltage of several kilovolts is applied between the anode 102 and the cathode 106 so as to flow the current of several ten microamperes between the anode 102 and the cathode 106. Since the current flowing into the cold cathode fluorescent lamp 100 during turning on the cold cathode fluorescent lamp 100 is relatively small compared with the voltage applied to the primary coil 264 and the secondary coil 266, the high-frequency current generated by on and off of the current in the primary coil 264 cannot be ignored compared with the current to be flowed into the cold cathode fluorescent lamp 100, in some cases. However, in this example, since one end of the secondary coil 266 is connected to the reference potential of the primary coil 264, the high-frequency current generated in the secondary coil 266 flows into the reference potential. Therefore, it is possible to reduce a high-frequency noise that is generated by the high-frequency current generated between the primary coil 264 and the secondary coil 266 on the resistor 412.

Moreover, assuming that a node between the resistor 412 and the resistor 414 is connected to the reference potential of the primary coil 264, the parasitic capacitance between the primary coil 264 and the secondary coil 266 and the high-frequency current generated by means of switching of the switching element 270 flow into the reference potential via the resistor 412. Therefore, the anode current detecting unit 410 cannot accurately detect the current flowing between the anode 102 and the cathode 106. However, according to this example, since a node between the secondary coil 266 and the resistor 412 is connected to the reference potential of the primary coil 264, the high-frequency current generated by means of switching of the switching element 270 does not flow into the resistor 412. Therefore, the anode current detecting unit 410 can accurately detect the anode current flowing between the anode 102 and the cathode 106.

The gate current detecting unit 430 includes a plurality of resistors 432, 434, 438, 442, 444, and 446, a plurality of capacitors 436 and 448, and an operational amplifier 440. One end of the resistor 432 is connected to the low potential side of the secondary coil 286, and another end is connected to the cathode 106. One end of the capacitor 448 is connected to a node between the resistor 432 and the secondary coil 286, and another end is connected to the reference potential. In this way, one end of the secondary coil 286 of the transformer 282 is connected to the reference potential of the primary side via the capacitor 448. One end of the resistor 434 is connected to a negative input terminal of the operational amplifier 440, and another end is connected to a node between the resistor 432 and the capacitor 448. One end of the resistor 438 is connected to the negative input terminal of the operational amplifier 440, and another end is connected to an output terminal of the operational amplifier 440. One end of the resistor 442 is connected to the cathode 106, and another end is connected to the reference potential via the resistor 444. A node between the resistor 442 and the resistor 444 is connected to a positive input terminal of the operational amplifier 440. The operational amplifier 440 outputs the voltage to be generated on both ends of the resistor 432 at the amplification factor determined by the resistance values of the resistor 434, the resistor 438, the resistor 442, and the resistor 444 to the output terminal. The resistor 446 is provided between the output terminal of the operational amplifier 440 and the reference potential. By such a configuration, the gate current detecting unit 430 detects the current flowing between a connecting point between the secondary coil 286 and the capacitor 448 and the cold cathode fluorescent lamp 100 to detect a gate current flowing between the gate 104 and the cathode 106.

The capacitor 436 is connected in parallel to the resistor 438 between the output terminal and the negative input terminals of the operational amplifier 440. Thereby, it is possible to reduce an amplification factor of the voltage according to the high-frequency current flowing into the resistor 432. Therefore, the gate current detecting unit 430 can remove the voltage based on the high-frequency current to precisely detect the voltage according to the current between the gate 104 and the cathode 106.

Here, assuming that the capacitor 448 is not provided in a node between the resistor 432 and the secondary coil 286 and anode between the resistor 432 and the cathode 106 is connected to the reference potential, the parasitic capacitance between the primary coil 284 and the secondary coil 286 and the high-frequency current generated by means of switching of the switching element 290 flow into the reference potential via the resistor 432. Therefore, the gate current detecting unit 430 cannot accurately detect the current flowing between the gate 104 and the cathode 106 in some cases. However, according to this example, since the node between the resistor 432 and the secondary coil 286 is connected to the reference potential of the primary coil 284 via the capacitor 448, the high-frequency noise occurring between the primary coil 284 and the secondary coil 286 can be reduced. Moreover, since the high-frequency current by switching of the switching element 290 flows into the reference potential via the capacitor 448 without flowing into the resistor 432, the gate current detecting unit 430 can precisely detect the gate current flowing between the gate 104 and the cathode 106.

Thus, since the anode current and gate current can be detected more precisely, a light amount of the cold cathode fluorescent lamp 100 can be controlled more precisely. In particular, although a noise with the size depending on vehicle travel is applied to the vehicular lamp 10, it is required that the vehicular lamp 10 be illuminated with desired brightness. According to the present embodiment, since the high-frequency noise applied to the anode current detecting unit 410 and the gate current detecting unit 430 is reduced, the cold cathode fluorescent lamp 100 can be illuminated with desired brightness, though the high-frequency noise is applied to the transformer 262 and the transformer 282.

In addition, in the gate current detecting unit 430, it is preferable that the sum of a resistance value of the resistor 434 and a resistance value of the resistor 438 is still larger, e.g., 100 or more times than that of each of the resistor 412 and the resistor 432. Thereby, it is possible to reduce an error voltage that is generated on the resistor 412 and the resistor 432 by the current flowing into the reference potential by the voltage generated on the output terminal of the operational amplifier 440 via the resistor 438, the resistor 434, the resistor 432, and the resistor 412. Therefore, it is possible to detect the anode current and gate current more precisely. Moreover, when the cold cathode fluorescent lamp 100 is illuminated, the voltage applied between the anode 102 and the cathode 106 is higher than that applied between the gate 104 and the cathode 106. In this way, the high-frequency current flowing between the anode 102 and the cathode 106 is larger than that flowing between the gate 104 and the cathode 106 in some cases. Moreover, when one end of the capacitor is connected to the reference potential, since the high-frequency noise is attenuated as much as the frequency component is high, the high-frequency noise component with relatively low frequency remains behind. Therefore, as described in this example, it is preferable to connect a path of the anode current to generate larger high-frequency noise to the reference potential and connect a path of the gate current to generate relatively small high-frequency noise to the reference potential via the capacitor 448.

Moreover, in this example, although the lighting controlling unit 200 has the transformer 262 and the transformer 282 as a power source for anode and a power source for gate, in another example, the lighting controlling unit 200 may have one transformer having two secondary coils. In this case, the current supplied between the anode 102 and the cathode 106 and between the gate 104 and the cathode 106 may separately controlled by providing a switch in an output of each of the secondary coils and controlling the switch.

Figure 5:
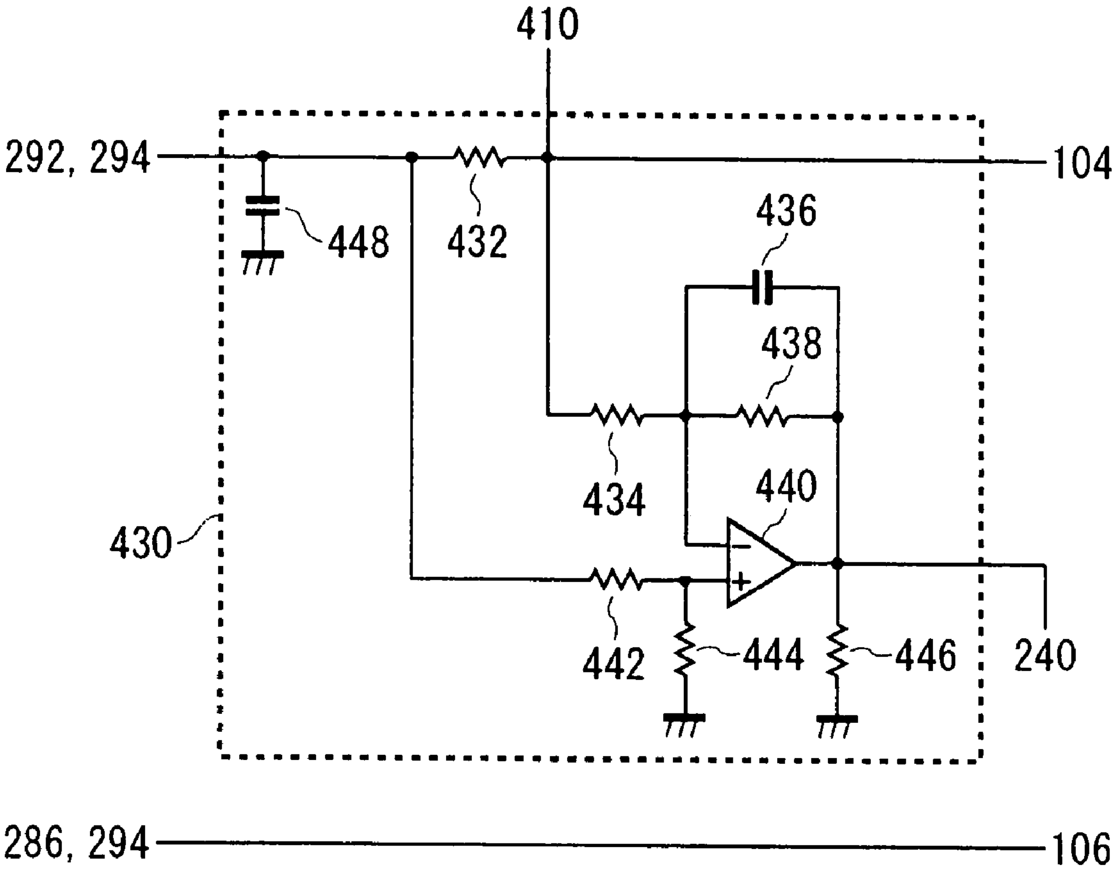
FIG. 5 is a circuit diagram showing another example of a detailed configuration of a gate current detecting unit.

FIG. 5 is a circuit diagram showing another example of a detailed configuration of the gate current detecting unit 430. In addition, since the components of FIG. 5 having the same reference numbers as those of FIG. 4 have the same or similar functions as/to those of FIG. 4, their descriptions will be omitted. One end of the resistor 432 is connected to the cathode of the diode 292, and another end is connected to the gate 104. The capacitor 448 is connected between a node between the diode 292 and the resistor 432 and the reference potential. One end of the resistor 434 is connected to the negative input terminal of the operational amplifier 440, and another end is connected to the gate 104 and the anode current detecting unit 410. One end of the resistor 442 is connected to a node between the resistor 432 and the capacitor 448, and another end is connected to the reference potential via the resistor 444. Also in this example, the gate current detecting unit 430 can precisely detect the current flowing between the gate 104 and the cathode 106.

Figure 6:
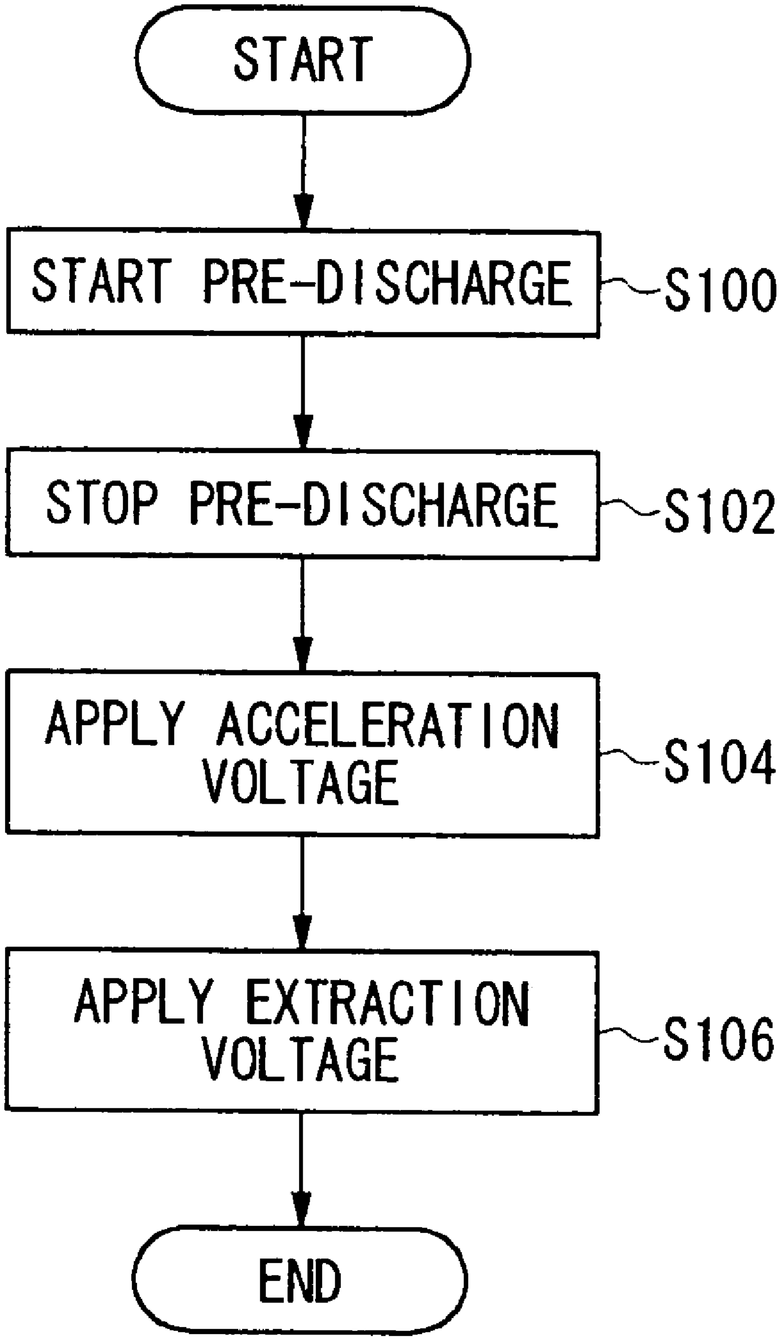
FIG. 6 is a flowchart exemplary showing an operation of a lighting controlling unit when turning on a cold cathode fluorescent lamp.

FIG. 6 is a flowchart exemplary showing an operation of the lighting controlling unit 200 when turning on the cold cathode fluorescent lamp 100. For example, as the switching control unit 240 receives the voltage indicating High from the switch 32, an operation of the lighting controlling unit 200 shown in this flowchart starts. At first, the switching control unit 240 controls the voltage applying unit 280, and applies, e.g., a voltage of several hundred volts between the gate 104 and the cathode 106 to pre-discharge electricity from the cathode 106 to the gate 104 (S100). After that, the switching control unit 240 controls the voltage applying unit 280, and lets down the voltage between the gate 104 and the cathode 106, e.g., to zero volts to stop pre-discharge from the cathode 106 to the gate 104 (S102).

Next, the switching control unit 240 controls the voltage applying unit 260, and applies, e.g., an acceleration voltage of several kilovolts between the anode 102 and the cathode 106 (S104). Then, the switching control unit 240 controls the voltage applying unit 280 and applies, e.g., an extraction voltage of several hundred volts between the gate 104 and the cathode 106 in order to start discharge from the cathode 106 to the anode 102 (S106) and ends the operation of the lighting controlling unit 200 when the lighting of the cold cathode fluorescent lamp 100 shown in this flowchart starts.

Thus, since the switching control unit 240 applies the acceleration voltage between the anode 102 and the cathode 106 after pre-discharging electricity from the cathode 106 to the gate 104 prior to illuminating the cold cathode fluorescent lamp 100, the cathode 106 gets warm prior to illuminating the cold cathode fluorescent lamp 100 and thus the electrons is easy to be ejected from the cathode 106. Therefore, if the switching control unit 240 only applies the same extraction voltage as that of lighting-up time between the gate 104 and the cathode 106 and the same acceleration voltage as that of lighting-up time between the anode 102 and the cathode 106, the lighting of the cold cathode fluorescent lamp 100 can start.

In addition, after the switching control unit 240 pre-discharges electricity from the cathode 106 to the gate 104 and thus the temperature of the cathode 106 rises till the substantially same temperature as that of lighting-up time in the step S100, the pre-discharge from the cathode 106 to the gate 104 may stop in the step S102. In this way, the switching control unit 240 can quickly start lighting of the cold cathode fluorescent lamp 100.

Figure 7A:
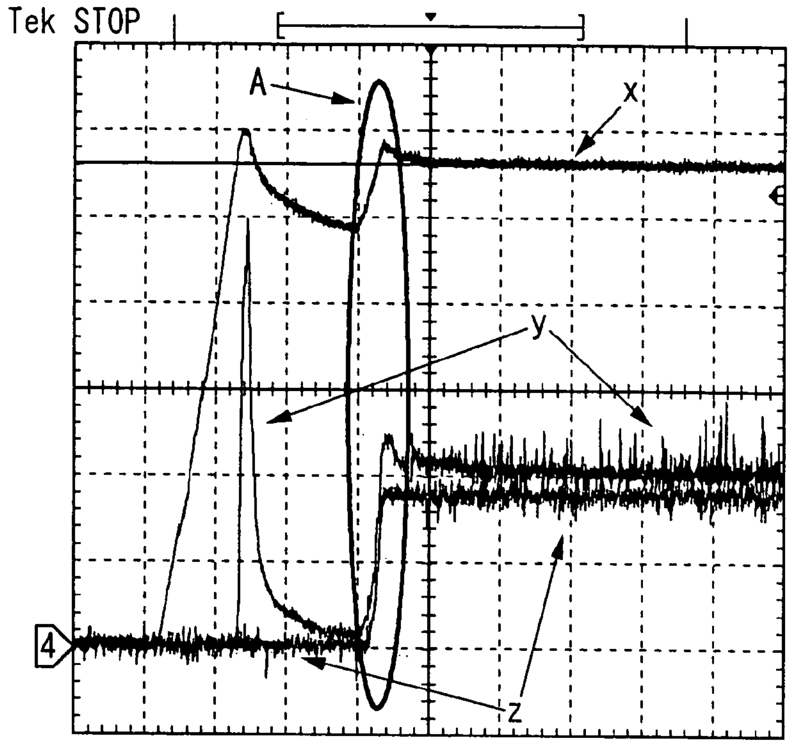
FIG. 7A is a graphic chart exemplary showing a relationship between a gate voltage, agate current, and an anode current when turning on the cold cathode fluorescent lamp.
Figure 7B:
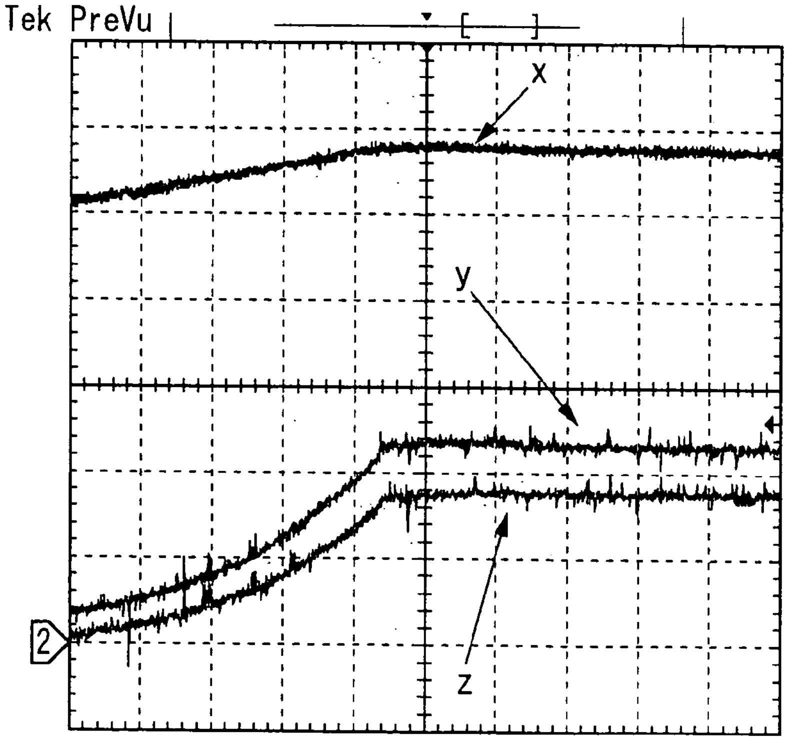
FIG. 7B is a graphic chart magnifying an area A shown in FIG. 7A.

FIG. 7A is a graphic chart exemplary showing a relationship between a gate voltage, a gate current, and an anode current when turning on the cold cathode fluorescent lamp 100, and FIG. 7B is a graphic chart magnifying an area A shown in FIG. 7A. In FIGS. 7A and 7B, the waveform x shows a change of the gate voltage between the gate 104 and the cathode 106, the waveform y shows a change of the gate current flowing between the gate 104 and the cathode 106, and the waveform z shows a change of the anode current flowing between the anode 102 and the cathode 106. As shown by the waveform x, by controlling the voltage applying unit 280, the switching control unit 240 raises the voltage between the gate 104 and the cathode 106, and then once lowers the voltage between the gate 104 and the cathode 106. After that, the switching control unit 240 again raises the voltage between the gate 104 and the cathode 106 till the extraction voltage that is the voltage of lighting-up time of the cold cathode fluorescent lamp 100.

Moreover, as shown by the waveform y, by pre-discharging the voltage between the gate 104 and the cathode 106 when this voltage is raised till the voltage capable of being pre-discharged, the gate current flows between the gate 104 and the cathode 106. In this case, the gate current flowing between the gate 104 and the cathode 106 is two or more times than the current with the cold cathode fluorescent lamp 100 turned on. Then, as the voltage between the gate 104 and the cathode 106 falls, the gate current falls. When the voltage between the gate 104 and the cathode 106 again rises till the extraction voltage, the discharge occurs from the cathode 106 to the gate 104 and thus the gate current flows between the gate 104 and the cathode 106.

Moreover, while being once lowering the voltage between the gate 104 and the cathode 106, the switching control unit 240 applies the acceleration voltage between the anode 102 and the cathode 106 and then once raises the voltage between the gate 104 and the cathode 106 till the extraction voltage. Thereby, as shown by the waveform z, as the gate voltage rises, the gate current and the anode current increase, the discharge starts from the cathode 106 to the anode 102, and the cold cathode fluorescent lamp 100 is illuminated. In this case, as shown in FIG. 7B, the gate current and the anode current also increase with rising of the gate voltage without an overshoot.

Here, when beginning to illuminate the cold cathode fluorescent lamp 100 by applying the extraction voltage between the gate 104 and the cathode 106 in a state that the acceleration voltage is applied between the anode 102 and the cathode 106, if the extraction voltage is applied between the gate 104 and the cathode 106, the anode 102 is overheated because the current flowing between the anode 102 and the cathode 106 is two or more times than the current with the cold cathode fluorescent lamp 100 turned on. The cold cathode fluorescent lamp 100 is formed of glass tubes, and the anode 102 is formed on the glass in some cases. In this case, when the anode 102 is overheated, the glass of the cold cathode fluorescent lamp 100 is damaged in some cases. Moreover, when the anode 102 is overheated, the phosphor applied on the anode 102 turns yellow and deteriorates in some cases. However, in this example, since the switching control unit 240 pre-discharges electricity from the cathode 106 to the gate 104 prior to illuminating the cold cathode fluorescent lamp 100, the cathode 106 gets warm prior to illuminating the cold cathode fluorescent lamp 100 and thus it is easy to be discharged. Thereby, it is possible to start lighting of the cold cathode fluorescent lamp 100 without flowing an excessive current into the anode 102. Therefore, it is possible to prevent an overshoot of the anode current at the lighting-up start of the cold cathode fluorescent lamp 100 and to prevent a damage and life shortening of the cold cathode fluorescent lamp 100.

Figure 8:
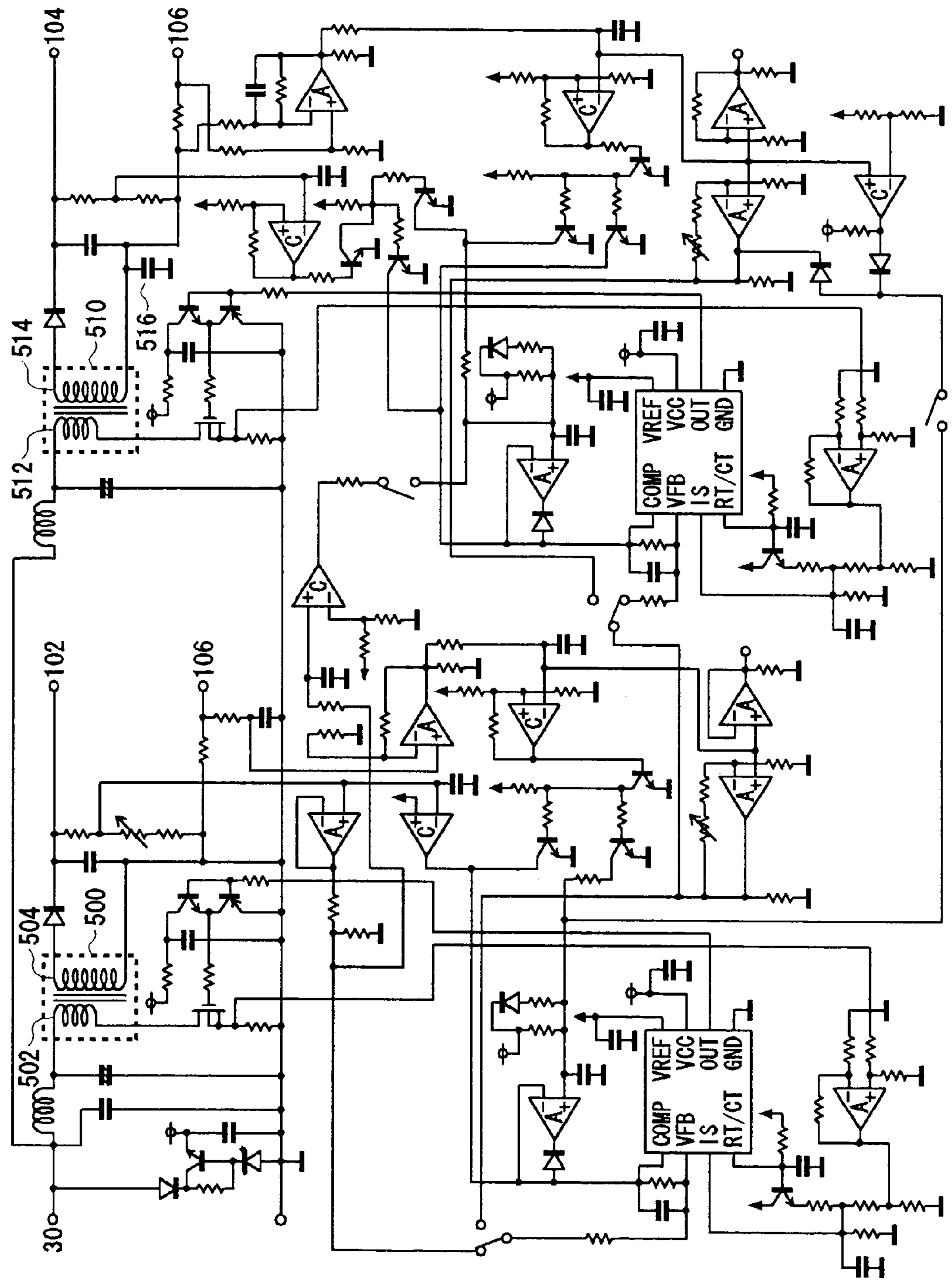
FIG. 8 is a circuit diagram showing another example of a detailed configuration of the lighting controlling unit.

FIG. 8 is a circuit diagram showing another example of a detailed configuration of the lighting controlling unit 200. The lighting controlling unit 200 includes a transformer 500, a transformer 510, and a capacitor 516. The transformer 500 has a primary coil 502 and a secondary coil 504. One end of the secondary coil 504 is connected to a reference potential of the primary coil 502. Also in this example, it can be reduced that the high-frequency current occurring by turning on or off the current of the primary coil 502 affects the anode current. Moreover, the transformer 510 has a primary coil 512 and a secondary coil 514. One end of the secondary coil 514 is connected to the reference potential of the primary coil 512 via the capacitor 516. Also in this example, it can be reduced that the high-frequency current occurring by turning on or off the current of the primary coil 512 affects the gate current. Therefore, it is possible to adequately detect the anode current and the gate current and illuminate the cold cathode fluorescent lamp 100 with an appropriate light amount.

Moreover, a power supply circuit for the gate 104 has a restricting means for restricting the current flowing into the gate 104 according to the current flowing into the anode 102, and controls the current flowing into the gate 104 according to the current flowing into the anode 102 in a feedback method. AT the lighting-up start of the cold cathode fluorescent lamp 100, this restricting means detects an excessive current flowing into the gate 104 and then restricts the gate current to, e.g., zero volts in order to stop the pre-discharge from the cathode 106 to the gate 104. Thereby, the excessive current flowing into the gate 104 at the lighting-up start can be controlled about two times compared with normal lighting.

As is apparent from the above description, according to the vehicular lamp 10 of the present embodiment, since the switching control unit 240 pre-discharges electricity from the cathode 106 to the gate 104 prior to lighting of the cold cathode fluorescent lamp 100, it is easy to illuminate the cold cathode fluorescent lamp. Moreover, since the switching control unit 240 applies a voltage between the anode 102 and the cathode 106 after once lowering a voltage between the gate 104 and the cathode 106 and then again applies an extraction voltage between the gate 104 and the cathode 106 in order to begin to discharge electricity from the cathode 106 to the anode 102, the switching control unit 240 can prevent excess current from flowing from the anode 102 to the cathode 106 at the lighting-up start. Therefore, it is possible to prevent a damage and life shortening of the cold cathode fluorescent lamp 100.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A vehicular lamp comprising:

a cold cathode fluorescent lamp having a cathode, a gate, and an anode; and a lighting controlling unit operable to pre-discharge electricity from the cathode to the gate prior to lighting of said cold cathode fluorescent lamp, wherein said lighting controlling unit applies a voltage between the cathode and the anode after once lowering a voltage between the cathode and the gate and then again applies an extraction voltage between the cathode and the gate in order to begin to discharge electricity from the cathode to the anode.

2. The vehicular lamp as claimed in claim 1, wherein said lighting controlling unit pre-discharges electricity from the cathode to the gate until the temperature of the cathode is substantially equal to that of lighting-up time.

3. A lighting apparatus of a cold cathode fluorescent lamp having a cathode, a gate, and an anode operable to pre-discharge electricity from the cathode to the gate prior to lighting of the cold cathode fluorescent lamp, applies a voltage between the cathode and the anode after once lowering a voltage between the cathode and the gate, and then again applies an extraction voltage between the cathode and the gate in order to begin to discharge electricity from the cathode to the anode.

4. A lighting method of a cold cathode fluorescent lamp having a cathode, a gate, and an anode, comprising:

a pre-discharge step of pre-discharging electricity from the cathode to the gate prior to lighting of the cold cathode fluorescent lamp;

a pre-discharge canceling step of once lowering a voltage between the cathode and the gate after said pre-discharge step;

an acceleration voltage applying step of applying an acceleration voltage between the cathode and the anode after said pre-discharge canceling step; and an extraction voltage applying step of applying an extraction voltage between the cathode and the gate after said acceleration voltage applying step.

* * * * *